No. 660,807. Patented Oct. 30, 1900.
H. ALTEN.
GATE.
(Application filed Aug. 11, 1900.)
(No Model.) 2 Sheets—Sheet 2.

UNITED STATES PATENT OFFICE.

HENRY ALTEN, OF SEBASTOPOL, CALIFORNIA.

GATE.

SPECIFICATION forming part of Letters Patent No. 660,807, dated October 30, 1900.

Application filed August 11, 1900. Serial No. 26,610. (No model.)

*To all whom it may concern:*

Be it known that I, HENRY ALTEN, a citizen of the United States, residing at Sebastopol, county of Sonoma, State of California, have invented an Improvement in Gates; and I hereby declare the following to be a full, clear, and exact description of the same.

My invention relates to improvements in gates such as are used upon farms and for like purposes.

It consists of a hinged gate adapted to swing so as to stand transversely across the road which is to be closed, or by swinging to one side to stand parallel with the roadway and leave a free passage, and in combination with such gate a mechanism by which the gate may be unlatched by a person approaching from either side and mechanism by which the gate is caused to swing to either open or close. In conjunction with this is a latching device by which the gate is retained in either its open or closed position.

It also comprises details of construction which will be more fully explained by reference to the accompanying drawings, in which—

Figure 1:
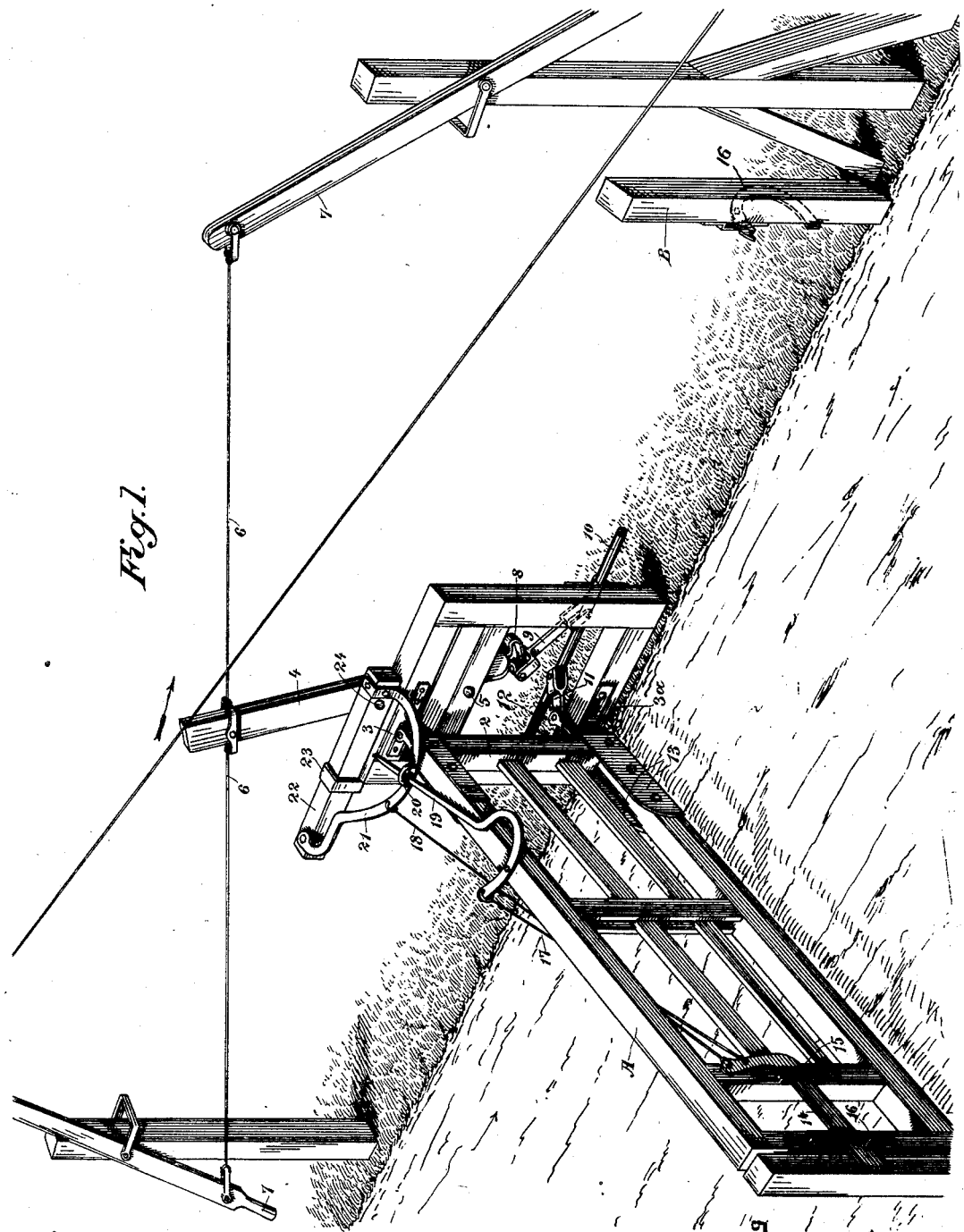
Figure 2:
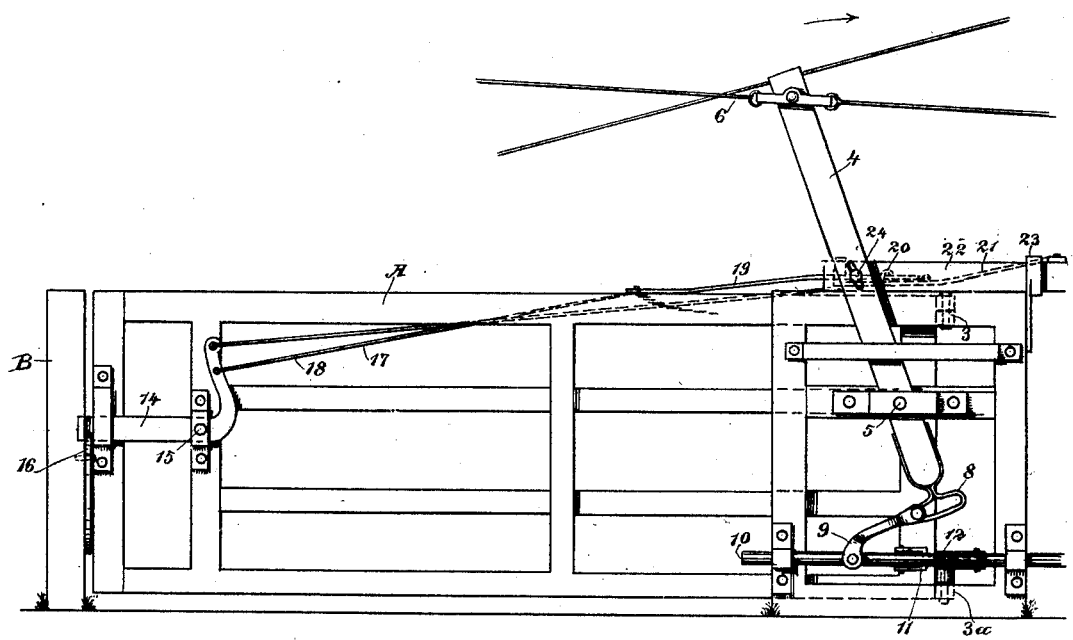

Figure 1 shows the gate in a closed position. Fig. 2 shows it open and locked against the side post. The arrow in Fig. 1 shows the line of travel of the operating-lever.

A is the gate, the rear stile 2 of which is pivoted at top and bottom. The top hinge is shown at 3. The other, 3ª, is directly in line beneath it.

The swinging of the gate is effected by means of a lever 4, pivoted, as at 5, to a fixed framework and having cords 6 connected with it and with levers 7, which are fulcrumed upon posts sufficiently distant from the gate to allow the passenger to drive up and by working one lever or the other to open the gate in the following manner:

Power applied to either of the levers 7 causes the lever 4 to swing about its fulcrum-point 5. The lower end of this lever 5 has a horizontally-slotted loop 8 fixed to it for a purpose to be hereinafter described, and this loop is connected by a link 9 with a guided slidable rod 10, so that when the lever 4 is tilted in either direction the preliminary movement simply causes the loop 8 to slip until the pin of the link 9 has moved from one end to the other of this loop. After that the pull upon the slidable rod 10 acts through a link 11, which is connected with its center, and a lever-arm 12, which is fixed to the gate by plates 13 on each side. This lever-arm 12 projects to the rear of the lower hinge of the gate and has sufficient purchase so that the movement of the sliding rod 10 will act to push the gate open.

The object of the elongated loop 8 and the lost motion of the lever 4 is to allow the latch-operating mechanism to be moved before the action upon the opening-lever takes place.

The latch 14 is fulcrumed, as at 15, and its free end engages a hinged swinging and counterweighted catch 16, which by reason of the manner in which it is allowed to swing will be depressed when the latch 14 strikes it in closing, and thus allow the latch to engage with it, the catch swinging back to hold the latch immediately after the latter has passed over the point of the catch. The rear end of the latch 14 is upturned and has connected with it two rods or wires 17 and 18. The wire 17 connects with the bent lever 19, fulcrumed upon the top of the gate, and the end of this lever passes through a loop 20 upon a peculiarly-curved bar or strap 21, which is fixed to the bar 22, this bar being slidable in guiding-straps at 23 and connected by a pin 24 with the tilting lever 4. The other cord 18 is fixed to the curved bar 21, and one of these cords acts to unlatch the gate when it is closed and the other to unlatch it when it is engaged with the latch on the post at the side of the roadway which holds it open.

The operation of this device is as follows: The first movement of the bar 4 when the gate is closed, as in Fig. 1, will cause the loop 8 to move over some distance without affecting the slidable bar 10; but during this movement as the lever 4 is connected with the slide 22 it moves this slide, and with it the curved bar or plate 21 and the loop 20, carried by it, and this loop, acting upon the lever 19, pulls upon the cord 17, so as to lift the latch 14 and free the gate. When this has been effected, the loop 8 and the lever 4 will then have been moved so far that it commences to act upon the link 9 and the slidable bar 10 and through the link 11 upon the hinged lever 12, thus swinging the gate open and causing it to latch with the catch 16, shown upon the post B at the side of the roadway in Fig. 1. It will be seen that when the gate is in this position there can be no movement of the slide 22 which would have any effect upon the lever 19 through the loop 20, as the latter would simply slide in line with the handle of this lever without moving it; but as the other cord 18 is connected directly with the curved arm 21, which is carried by the slidable bar 22, the movement of this slidable bar by the return of the lever 4 in the direction shown by the arrow, Fig. 2, would pull upon the cord 18, and would thus act in the same manner to disengage the latch from the holding-catch and allow the links and connections at the bottom of the gate to close it in the same manner that it had been opened.

Having thus described my invention, what I claim as new, and desire to secure by Letters Patent, is—

1. The combination with a hinged swinging gate of a lever-arm projecting rearwardly therefrom, a horizontally-slidable guided bar, a link connecting said bar with the lever, a vertically-fulcrumed lever connected with the sliding bar, other vertically-fulcrumed levers, upon posts upon each side of the driveway and cords connecting said levers with the central operating-lever.

2. The combination with a hinged swinging gate of a lever-arm projecting rearwardly therefrom, a horizontally-slidable guided bar, a link connecting said bar with the lever, a vertically-fulcrumed lever connected with the sliding bar by means of a link, and having an elongated loop whereby the lever is allowed a considerable movement before acting upon the parts moved thereby, a latch and connections between said latch and the lever whereby the latter acts to disengage the latch before operating to turn the gate about its hinges.

3. A hinged swinging gate having an arm projecting rearwardly therefrom, a pivoted vertically-swinging lever, a loose connection between the lower end of said lever and an intermediate mechanism by which the arm is moved to swing the gate, a slide connected and movable with the lever, an arm fulcrumed upon the gate and movable in unison with the slide, a latch by which the gate is normally retained in its closed position, and a cord connecting the latch with the slide-actuated arm whereby the latch is raised before movement is communicated to swing the gate.

4. A hinged swinging gate having a rigid arm projecting horizontally therefrom, a vertically-swinging fulcrumed lever, loose connections between said lever and the arm by which the gate is caused to swing, a slide with which the lever is connected, a bent arm fixed to said slide, an arm fulcrumed upon the gate having one end engaged and actuated by the slide and the other connected with the latch by which the gate is held in its closed position, and a second cord connecting the bent arm with the latch, and acting to release the gate from the latch by which it is held in its open position.

5. A hinged swinging gate, a lever fulcrumed to swing vertically in rear of the hinge-post, an arm projecting horizontally to the rear of the gate-hinge, loose connections between the lever and said arm, and means for swinging the lever, a latch by which the gate is held in either its closed or its open position, a device for releasing the latch when the gate is closed, consisting of an arm fulcrumed upon the gate, a cord connecting it with the latch, a slidable bar connected with the lever whereby the arm and latch-cord are actuated by the swinging of the lever previous to the turning of the gate upon its hinges, a curved arm fixed to the slide, and a cord connecting this arm also with the latch whereby the movement of the lever and slide when the gate is opened, will act to disengage the latch.

6. A hinged swinging gate, an arm extending horizontally to the rear of the hinges, a vertically-fulcrumed lever and connections between it and other levers fulcrumed to posts at the side of the roadway whereby said lever may be tilted about its fulcrum-point, loose connections between said lever and the arm, a sliding bar connected with and actuated by the lever, a latch having a horizontal portion fulcrumed to the gate and an upturned end, cords connecting said latch with the slide whereby the preliminary movement of the lever first acts to disengage the latch before operating to swing the gate.

7. A hinged swinging gate, a lever, connections between said lever and other levers at the side of the roadway, whereby said lever may be caused to swing about its fulcrum, loose connections between the lower end of said lever and an arm by which the gate is caused to swing, a slide connected with and operated by the lever, a latch, connections between said latch and the slide whereby the latch is raised by the initial movement of the lever, and a catch with which the latch is adapted to engage, said catch being fulcrumed to the post against which the gate closes, and having a semicircular weighted lower end by which it is yieldingly maintained in position to engage the latch.

In witness whereof I have hereunto set my hand.

HENRY ALTEN.

Witnesses:
F. W. GILL,
H. B. MORRIS.